No. 835,972. PATENTED NOV. 13, 1906.
J. C. W. MILLER.
INK OR MUCILAGE BOTTLE.
APPLICATION FILED MAR. 7, 1906.
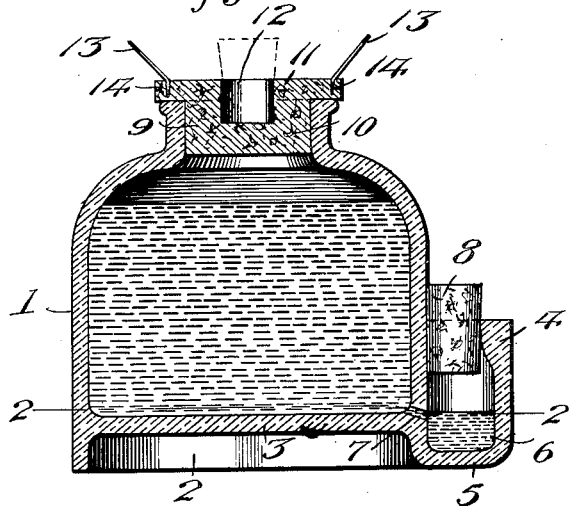
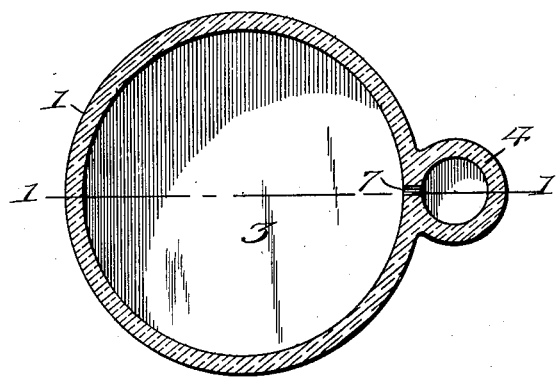
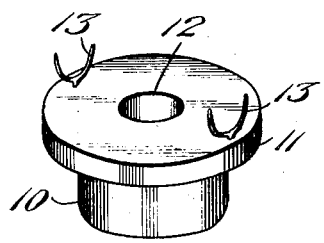
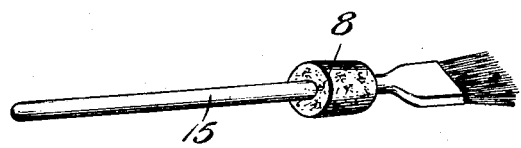
Witnesses
Frank B. Hoffman
C. C. Hines
Inventor
John C. W. Miller
By Victor J. Evans
Attorney

UNITED STATES PATENT OFFICE.

JOHN C. W. MILLER, OF WENATCHEE, WASHINGTON.

INK OR MUCILAGE BOTTLE.

No. 835,972.     Specification of Letters Patent.     Patented Nov. 13, 1906.

Application filed March 7, 1906. Serial No. 304,726.

*To all whom it may concern:*

Be it known that I, JOHN C. W. MILLER, a citizen of the United States of America, residing at Wenatchee, in the county of Chelan and State of Washington, have invented new and useful Improvements in Ink or Mucilage Bottles, of which the following is a specification.

This invention relates to improvements in ink or mucilage wells or bottles, the object of the invention being to provide an improved construction of bottle of that character provided with an exterior well or dip-basin communicating with the interior of the bottle and automatically supplied with ink or mucilage therefrom, the construction being such as to maintain the ink or mucilage in the well at all times at a prescribed level. The invention secures the production of a bottle of this type in which the entire exhaust of the contents of the bottle to the well is permitted in an effective manner, this advantage being attained by a novel construction of parts enabling the bottle to be manufactured and sold at a low cost.

The invention further provides an improved pen or pencil support and holder for supporting the stopper of the well when the latter is in use.

In the accompanying drawings, Figure 1 is a central vertical section through the bottle on the plane indicated by the line 1 1 of Fig. 2. Fig. 2 is a horizontal section on the line 2 2 of Fig. 1. Fig. 3 is a perspective view of the neck-stopper. Fig. 4 is a view showing the mode of mounting the well-stopper upon a brush when the device is used as a mucilage-bottle.

Referring to the drawings, 1 designates the body of the bottle, which is preferably made of glass, but may be of any other suitable material and of any desired form or configuration. The body is formed with a base-flange 2, upon which it rests, and with an elevated bottom 3, disposed at a suitable elevation above the lower edge of the flange 2. A well or dip-basin 4 is formed upon one side of the bottle and is integral therewith and is provided with a bottom wall 5, extending down into the plane of the lower edge of the flange 2, thus forming an ink or mucilage receiving chamber 6, arranged below the upper surface of the bottom 3. The adjacent portion of the wall of the bottle-body forming the inner wall of the well is provided with a contracted feed duct or passage 7, communicating at its inner end with the bottle immediately above the bottom 3 and at its outer end with the well-chamber at a point normally just a little below the level of the liquid therein. The duct 7 accordingly extends at an outward and downward angle, so that the entire contents of the body of the bottle may be fed into the well.

The upper end or mouth of the well is contracted to receive a suitable stopper 8, whereby the well may be closed when not in use and during the process of filling the bottle, while the neck 9 of the latter is adapted to be closed by a stopper 10, provided with a flange 11 to rest upon the rim of the neck. The said stopper 10 may be made of any suitable material and is formed with a central socket 12, in which the stopper 8 may be fitted and held when the well 4 is in use. The stopper 10 may be provided with means for supporting a pen, pencil, or mucilage-brush. In the present instance I have shown a holder for this purpose comprising a pair of forked supports 13, disposed upon diametrically opposite sides of the socket 12 and provided with threaded stems 14, entering corresponding recesses in the flange 11. The mode of use of these supports will be readily understood.

In the process of filling the bottle the stopper 8 is applied to close the well 4, the stopper 10 removed, and the ink or mucilage introduced into the bottle through the neck 9. The stopper 10 is then applied to seal the neck securely against the entrance of air to the bottle, and when it is desired to use the well 4 the stopper 8 is removed therefrom and inserted in the socket 12. The ink or mucilage within the bottle will feed through the duct 7 into the well until the same rises in the well sufficient to close the outer end of the duct, and as the level of the liquid in the well is reduced by use or evaporation the normal level will be restored by the automatic feed of the liquid through the passage 7 until the entire contents of the bottle is discharged, the peculiar form and arrangement of the well and duct allowing the entire amount of liquid within the bottle-body to drain out.

It will be seen that the desirable advantage above set forth is secured in an effective manner without adding to the cost of construction over other bottles of this type and that the use of auxiliary attachments for the purpose is obviated.

When the bottle is used as a mucilage-receptacle, the stopper 8 may be longitudinally apertured to fit tightly upon the handle of the mucilage-brush 15, so that the brush-head of the latter may fit within the well with the brush portion normally submerged to prevent the mucilage from drying thereon.

Having thus described the invention, what is claimed as new is—

1. A bottle of the character described having a mouth or filling-opening and a well, the latter being in communication with the body of the bottle for an automatic feed thereto, a stopper for closing the well, a stopper for closing the mouth, said stopper being formed with a socket to receive the well-stopper when the well is in use, and forked supports on the mouth-stopper arranged on opposite sides of said socket and inclined outwardly therefrom.

2. A fountain ink or mucilage bottle comprising a circular body portion having a top filling-neck and a closure therefor, an elevated bottom, a supporting-flange extending below the bottom, a substantially circular well upon the exterior of the body having its inner side formed by the wall of the body and provided with a bottom wall extending below the plane of the bottom wall of the body and terminating in the plane of the bottom edge of the flange, a partition-wall of single thickness being thereby formed between the body and well, said partition-wall extending uniformly to the elevated bottom and being formed with a narrow feed-duct extending at an outward and downward angle, said duct communicating at its inner end with the body immediately above the elevated bottom and at its outer end with the well on a plane below the upper surface of said bottom, the well having a contracted mouth, and a stopper to fit within said contracted mouth to close the well.

In testimony whereof I affix my signature in presence of two witnesses.

JOHN C. W. MILLER.

Witnesses:
HENRY CROSS,
J. W. DONEEN.